United States Patent [19]

Deininger

[11] Patent Number: 5,202,108

[45] Date of Patent: Apr. 13, 1993

[54] PROCESS FOR PRODUCING FERRATE EMPLOYING BETA-FERRIC OXIDE

[75] Inventor: J. Paul Deininger, Colorado Springs, Colo.

[73] Assignee: Analytical Development Corporation, Colorado Springs, Colo.

[21] Appl. No.: 596,877

[22] Filed: Oct. 12, 1990

[51] Int. Cl.$^5$ .......................................... C01G 49/00
[52] U.S. Cl. .................................. 423/594; 423/633; 423/266
[58] Field of Search ........................ 423/594, 266, 633; 501/134, 135; 252/62.56, 519, 62.6

[56] References Cited

U.S. PATENT DOCUMENTS

| | | | |
|---|---|---|---|
| 2,455,696 | 12/1948 | Mosesman | 502/330 |
| 2,536,703 | 1/1951 | Schreyer | 423/264 |
| 2,758,090 | 8/1956 | Mills et al. | 252/186.33 |
| 2,785,991 | 3/1957 | Bennetch | 423/633 |
| 2,835,553 | 5/1958 | Harrison | 423/594 |
| 3,243,375 | 3/1966 | Jeschke | 252/62.56 |
| 3,632,802 | 1/1972 | BeMiller et al. | 536/105 |
| 4,304,760 | 12/1981 | Mein et al. | 423/150 |
| 4,385,045 | 5/1983 | Thompson | 423/594 |
| 4,405,573 | 9/1983 | Deininger et al. | 423/150 |
| 4,435,256 | 3/1984 | Deininger | 204/86 |
| 4,435,257 | 3/1984 | Deininger et al. | 204/86 |
| 4,451,338 | 5/1984 | Deininger et al. | 204/86 |
| 4,500,499 | 2/1985 | Kaczur et al. | 423/139 |
| 4,545,974 | 10/1985 | Thompson | 423/594 |
| 4,551,326 | 11/1985 | Thompson | 423/594 |
| 4,606,843 | 8/1986 | Kaczur | 252/186.33 |
| 4,983,306 | 1/1991 | Deininger et al. | 210/724 |

FOREIGN PATENT DOCUMENTS

| | | | |
|---|---|---|---|
| 58-135136 | 8/1983 | Japan | 423/633 |
| 63-162535 | 7/1988 | Japan | 423/633 |

OTHER PUBLICATIONS

Murmann et al. "Experiments Utilizing $FeO_4^{-2}$ For Purifying Water", *Water Research*, vol. 8, pp. 543–547 (1974).
Waite, "Feasibility of Wastewater Treatment With Ferrate", *The Journal of The Environmental Engineering Division*, Proceedings of American Society of Civil Engineers, vol. 105, No. EE6, pp. 1023–1034, Dec. 1979.
Schreyer et al., "Potassium Ferrate(VI)", *Inorganic Synthesis*, vol. IV, pp. 164–169 (Mar. 1951).
Audette et al., "Potassium, Rubidium, Cesium and Barium Ferrate (VI): Preparations, Infrared Spectra and Magnetic Susceptibilities", *Inorganic Chemistry*, vol. 11, No. 8, pp. 1904–1908 (1972).
Mellor, *A Comprehensive Treatise on Inorganic and Theoretical Chemistry*, pp. 929–937, Longmans, Green & Co., London (1952).
Williams et al., "Preparation and Alcohol Oxidation Studies of the Ferrate(IV) Ion, $FeO_4^{-2}$," *Inorganic Chimica Acta*, vol. 8, pp. 177–183 (1974).
Thompson, et al., "Preparation and Purification of Potassium Ferrate(VI)", *J. Am. Chem. Soc.*, vol. 73, pp. 1379–1381.
Grube et al., "The Effects of Superimposed Alternating Current on Anodic Ferrate Formation", *Zeitschrift Fur Elektrochemie*, vol. 26, Nr. 7/8, pp. 153–161 (1920).
Kokarovtseva, et al., "Oxygen Compounds of Iron (VI, V, and IV)", *Russian Chemical Reviews*, vol. 41 (11) pp. 929–937 (1972).
Hrostowski et al., "The Magnetic Susceptibility of Potassium Ferrate", *The Journal of Chemical Physics*, vol. 18, No. 1, pp. 105–107 (1950).
Helferich et al., "On the Salts of Ferric Acid", *Z. anorg. allg. Chemie*, 263, pp. 169–174 (1950).
Tousek, *Elektro Chemische Darstellung Des Natriumferrats (VI)*, pp. 914–919 (1961).
Scholder et al., "Zur Kenntnis der Ferrate(VI)", *Z. anorg. allg. Chemie*, pp. 268–279 (1955).

*Primary Examiner*—Michael Lewis
*Assistant Examiner*—Ngoc-Yen M. Nguyen
*Attorney, Agent, or Firm*—Sheridan Ross & McIntosh

[57] ABSTRACT

A process for producing stable, high purity ferrate (VI) employing beta-ferric oxide (beta-$Fe_2O_3$), and preferably monohydrated beta-ferric oxide (beta-$Fe_2O_3 \cdot H_2O$) as the iron source. An improved process for producing stable, high purity beta-ferric oxide is also disclosed. The process results in the efficient and effective productions of ferrate with high yields and small amounts of waste production. A large portion of the unused product stream can be recycled to the ferrate reactor for the production of additional ferrate.

33 Claims, 1 Drawing Sheet

PROCESS FOR PRODUCING FERRATE EMPLOYING BETA-FERRIC OXIDE

FIELD OF THE INVENTION

The present invention relates to a process generally directed to the production of alkali metal ferrates and specifically directed to the production of ferrates employing beta-ferric oxide (beta-$Fe_2O_3$).

BACKGROUND OF THE INVENTION

The ferrate ion, $FeO_4^{-2}$, in which iron exhibits a valence of six is a powerful and useful oxidizer. A major problem, however, in the production of ferrates using aqueous process is that ferrates are unstable. Specifically, alkali metal and alkaline earth metal ferrates, i.e. salts having the anion $FeO_4^{-2}$ are relatively stable when dry, but when dissolved in water, they decompose rapidly.

Ferrates have many known uses such as those described in U.S. Pat. No. 4,405,573 by Deininger et al., issued Sep. 20, 1983. U.S. Pat. No. 4,405,573 is incorporated herein by reference in its entirety. For example, as described in U.S. Pat. No. 2,758,090 by Mills et al., issued on Aug. 7, 1956, ferrate has been employed to bleach vegetable fibers, to effect organic reactions and to oxidize sulfurous acid, nitrites, ferrocyanides and other inorganic material. The ferrate(VI) ion has been used to decolorize caustic solutions as disclosed in U.S. Pat. No. 2,536,703 by Schreyer, issued on Jan. 2, 1951; and to oxidize carbohydrates as disclosed in U.S. Pat. No. 3,632,802 by BeMiller et al. issued Jan. 4, 1972.

Ferrates have also been studied for their uses in wastewater treatment. For example, Murmann et al., "Experiments Utilizing $FeO_4^{-2}$ for Purifying Water," *Water Research*, vol. 8, pp. 79-83 (1974) showed the use of ferrate in removing some toxic trace metals from wastewater and Waite, "Feasibility of Wastewater Treatment with Ferrate," Proceedings of the American Society of Civil Engineers, Vol. 105, No. EE6, December 1979 showed the use of ferrate use in removal of suspended solids, phosphate, ammonia, and the disinfection of bacteria in wastewater.

In addition to these uses, it has recently been discovered that wastewater solutions containing radioactive transuranic elements and compounds can be cleaned by precipitating transuranics therefrom using ferrate. This process is described in U.S. patent application Ser. No. 07/349,285, entitled "Method of Treating Wastewater", now U.S. Pat. No. 4,983,306 issued Jan. 8, 1991 the disclosure of which is incorporated herein by reference in its entirety.

One problem preventing the widespread use of such processes is that ferrates are difficult to produce, particularly in commercial quantities. In the late 1940's, Schreyer developed a laboratory method for the production of potassium ferrate(VI). In this method, a sodium hypohalite or halogen gas (e.g. NaOCl or $Cl_2$) is reacted with a ferric salt in an aqueous NaOH solution to produce $Na_2FeO_4$. The $Na_2FeO_4$ is then converted to potassium ferrate(VI) by the addition of KOH. Schreyer et al., "Potassium Ferrate(VI)", *Inorganic Synthesis*, Vol. IV, pages 164–169 (March 1951).

Another laboratory method which employs a hypohalite/ferric salt reaction technique involves the direct reaction of potassium hypochlorite, potassium hypobromite or a halogen gas with $Fe(OH)_3$ in the presence of an alkali metal hydroxide to form and precipitate $K_2FeO_4$. U.S. Pat. No. 2,455,696 by Mosesman issued Dec. 7, 1948; and Audette et al., "Potassium, Rubidium, Cesium and Barium Ferrate(VI): Preparation, Infrared Spectra and Magnetic Susceptibilities," Inorganic Chemistry, Vol. 11, No. 8, pages 1904–1908 (1972).

There are a number of problems with the above methods for the production of ferrates which are based on the reaction of an alkali metal hypohalite with an iron-containing compound. First of all, ferrate(VI) is unstable in aqueous solution and rapidly degrades to produce ferric hydroxide, particularly in the presence of even small amounts of metallic or organic impurities. Second, large amounts of waste material are produced leading to economic inefficiencies and an acceleration in the decomposition of the ferrate ions. Third, the hypohalite (e.g. NaOCl) is unstable. Fourth, excessive heat is generated during the reaction which can rapidly degrade the ferrate and the hypohalite. Finally, excessive amounts of potassium chloride salt and the like are produced as byproducts, particularly in the production of potassium ferrate.

Other methods for producing ferrates include the electrolysis of iron-containing materials in a electrolytic cell containing KOH or the like, or by fusing iron or ferric oxide with potassium nitrate in the presence of KOH. See Mellor, A Comprehensive Treatise on Inorganic and Theoretical Chemistry, pages 929-937, Longmans, Green & Co., London (1952) and U.S. Pat. No. 4,435,257 by Deininger et al., issued Mar. 6, 1984.

In U.S. Pat. No. 4,435,257 by Deininger, an electrolytic process for producing sodium ferrate in a membrane-type electrolysis cell is described. Specifically, an electrolytic cell is charged with an aqueous solution of sodium hydroxide, a sodium halide salt and ferric ions ($Fe^{3+}$) in the anolyte chamber and sodium hydroxide solution in the catholyte chamber. While it is not certain how sodium ferrate is produced in this process, a theory is disclosed that the iron anode or iron salt is converted in the electrolysis process or by reaction with $OH^-$ ions, into ferric oxyhydroxide [e.g. $Fe_xO_y \cdot nH_2O$ where n is greater than 1], then electrochemically converted in the presence of the halide ion to ferrate ion.

The above-described methods of ferrate production by electrolysis and the fusing of an iron source with potassium nitrate also have significant disadvantages. The direct electrolysis method is commercially impractical for continuous operation because of the passivation of the iron anode by the formation of a ferric oxide film which causes an increase in voltage and a decrease in ferrate production. In addition, the yields produced by this type of process are small. With respect to fusing iron or ferric oxide with potassium nitrate to produce ferrates, this method requires high temperatures and also produces a small yield.

Other processes for producing alkali metal ferrates are described in U.S. Pat. No. 4,385,045 by Thompson, issued May 24, 1983 and U.S. Pat. No. 4,545,974 by Thompson, issued Oct. 8, 1985. The first process involves subjecting a particulate reactant mixture of elemental iron and an alkali metal peroxide to high temperatures in the substantial absence of free oxygen. The second method involves reacting an alkali metal nitrate or alkaline earth metal nitrite with hematite ($Fe_2O_3$), magnetite ($Fe_3O_4$), or an iron compound which self-reacts via thermal decomposition at a temperature less than about 1100° C. to form $Fe_2O_3$, followed by subjecting the reactants to high temperatures in the range of about 780° C. to about 1100° C. for a specified period of time. These processes have the disadvantages of requiring energy-consuming high temperatures and producing low yields of product. In addition, the resulting product of these processes is a mixture of iron(IV) ferrates and iron(VI) ferrates, rather than a substantially pure iron(VI) ferrate product.

A process for producing potassium ferrate is also described in U.S. Pat. No. 4,405,573 by Deininger et al., issued Sep. 20, 1983. The process of this patent involves the production of potassium ferrate by the reaction of a substantially pure ferric salt, substantially pure $Cl_2$ and aqueous KOH containing less than 10 parts per million by weight of total harmful metallic and organic impurities through the reaction of intermediates KOCl and $Fe(OH)_3$ in the presence of a stabilizing proportion of an alkali metal silicate.

The process described in this patent has several disadvantages. First, the addition of ferric salt directly to the hypochlorite reactor generates excessive heat which degrades both hypochlorite and ferrate, resulting in reduced yields and increased byproduct salt wastes. Second, the process of this patent includes washing with organic solvents which are difficult to dispose of and remain in the ferrate product in trace amounts. These trace amounts result in an unstable ferrate product with a relatively short shelf-life. Typically, such an unstable ferrate product is unsuitable for use in wastewater treatment applications. Third, it is difficult to use recycled liquids in the process of this patent as the proper water balance cannot be easily maintained, and evaporative removal of water is nearly impossible.

None of the above described methods provide for the production of ferrate in an economic manner on a commercial scale (i.e. 0.25 tons to 100 tons per day). Therefore, it would be advantageous to provide a commercially feasible production method for ferrates which results in high yields of high purity ferrates in an economic and efficient manner. As used herein, the term "high purity ferrates" means a ferrate product which is substantially Fe(VI), rather than other iron forms such as Fe(III). High purity does not relate to the amount of ferrate which is produced by the process of this invention as compared to other acceptable byproducts such as potassium chloride. The term "commercially feasible production" means production of ferrates in daily quantities of at least approximately one hundred pounds per day with minimal byproduct formation and waste disposal problems.

SUMMARY OF THE INVENTION

Accordingly, the present invention is directed to an improved process for preparing alkali metal ferrates employing beta-$Fe_2O_3$ (preferably monohydrated) as a source of iron, and is also directed to a process for producing high assay, stable monohydrated beta-$Fe_2O_3$.

In accordance with one embodiment of the present invention, alkali metal ferrate is produced using beta-$Fe_2O_3$ as a feed to an oxidizing reactor. The oxidizing reactor can be either a hypohalite or an electrochemical reactor. Preferably, ferrate is produced in a hypohalite reactor employing monohydrated beta-$Fe_2O_3$, hypohalite, and hydroxide as reactants.

In another embodiment of the present invention, the ferrate which is produced in an oxidizing reactor is recovered as a ferrate-containing slurry, which is subjected to solid/liquid separation such as centrifuging or filtration. The dewatered ferrate slurry concentrate can then be dried in a one step process by employing carbon dioxide-containing gas, leaving a dried ferrate-containing product.

In another embodiment of the present invention, the filtrate stream which is removed from the ferrate slurry is recycled to the ferrate reactor to provide for additional production of ferrate. Preferably, the filtrate is combined with a strong base, such as a hydroxide, and $Cl_2$. Solid precipitates (e.g. KCl) are removed and the stream is reused in the continuous production of an alkali metal ferrate.

In accordance with a preferred embodiment of the present invention, potassium hydroxide, potassium hypochlorite, and potassium iodide are employed in the ferrate reactor together with beta-$Fe_2O_3$, resulting in the efficient production of relatively stable potassium ferrate.

In accordance with another embodiment of the present invention, an improved method for producing monohydrated beta-$Fe_2O_3$ is provided which involves reacting a ferric salt, preferably $FeCl_3$, with a carbonate salt in the presence of an oxidizing agent and a phosphate compound. Preferably, monohydrated beta-$Fe_2O_3$ is prepared at a final pH greater than about pH 9. Further, monohydrated beta-$Fe_2O_3$ can be recovered using a centrifugal decanter and the recovered and dewatered monohydrated beta-$Fe_2O_3$ can be employed in the production of alkali metal ferrate.

In accordance with another embodiment of the present invention iodine or tellurium compounds having a valence state of $-1$ to $+7$ are employed in the oxidizing reactor to improve the stability of the ferrate product. Such compounds act as ferrate and hypochlorite stabilizers in the oxidizing reactor of this invention.

BRIEF DESCRIPTION OF THE DRAWING

The FIGURE shows a flow chart illustrating a preferred method for making and separating alkali metal ferrates.

DETAILED DESCRIPTION OF THE PREFERRED EMBODIMENT

PRODUCTION OF FERRATE

Figure 1:
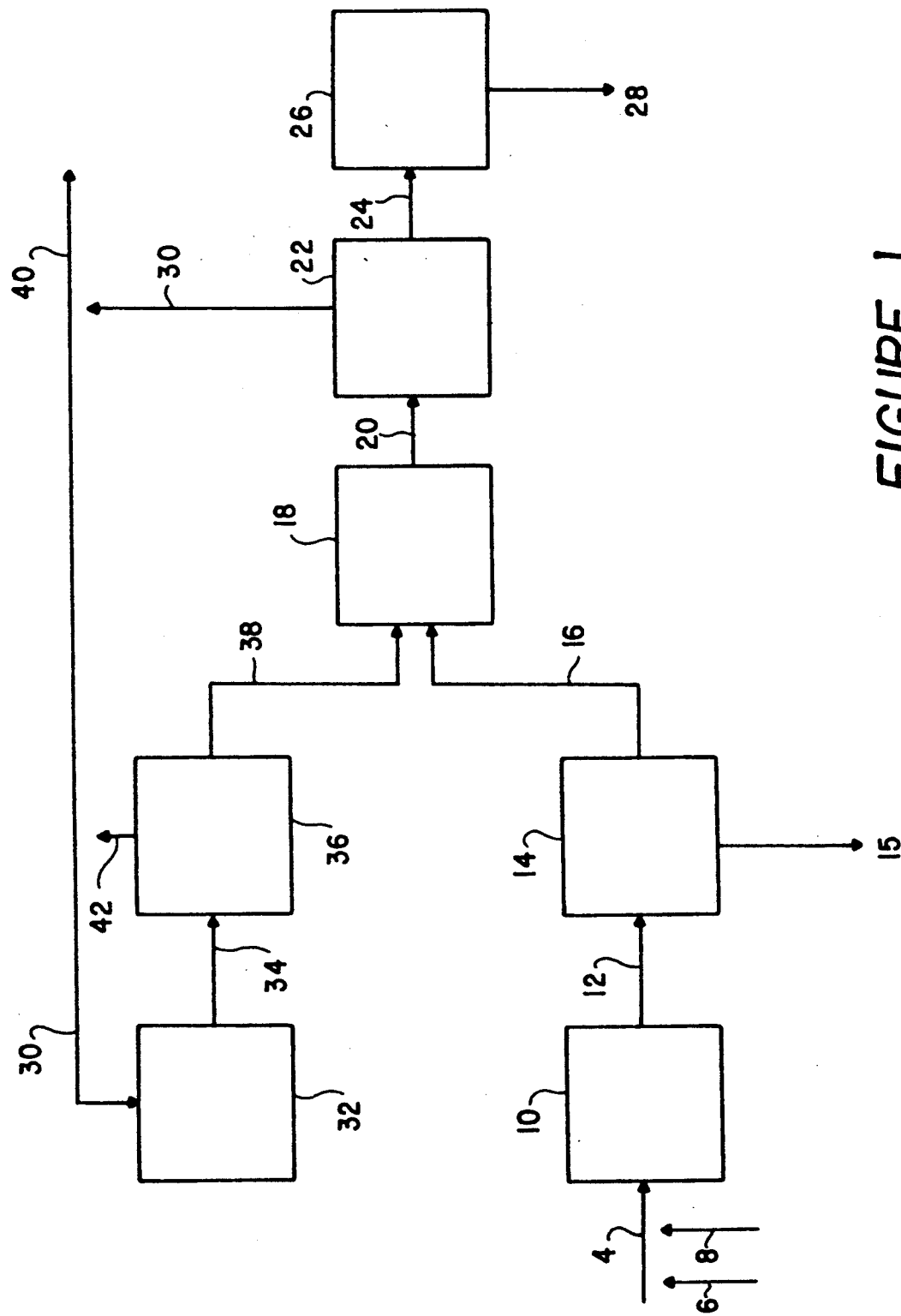

Although methods of producing ferrate in hypohalite solution or by electrolysis are known, the novel process of the present invention results in unexpectedly high yields, fast reaction rates and minimal problems due to excessive heat generation. It has been found that these unexpected and improved results derive from the use of beta-ferric oxide (beta-$Fe_2O_3$) and preferably monohydrated beta-ferric oxide (beta-$Fe_2O_3 \cdot H_2O$) as the iron source in the reaction, rather than the previously employed ferric(III) compounds.

The reaction of this invention can be illustrated by the following Equation (A):

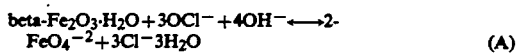

$$\text{beta-Fe}_2\text{O}_3\cdot\text{H}_2\text{O} + 3\text{OCl}^- + 4\text{OH}^- \longleftrightarrow 2\text{FeO}_4^{-2} + 3\text{Cl}^- \cdot 3\text{H}_2\text{O} \tag{A}$$

The substantially pure beta-$Fe_2O_3$ employed in this invention for the production of ferrate may be produced by any known method, and is preferably monohydrated beta-$Fe_2O_3$ produced by the novel process which is provided below. In order to prevent the rapid decomposition of the ferrate product, the beta-ferric oxide employed in the process of this invention must be substantially pure, containing no more than 3000 parts per million (ppm) by weight of harmful metallic impurities, undesired organic impurities or inorganic impurities, and preferably containing less than about 1000 ppm by weight of impurities. Examples of harmful metallic impurities include ferrous ions [Fe(II)], nickel, cobalt, copper, molybdenum, mercury, vanadium, chromium, ruthenium, platinum, palladium, osmium, rhodium and iridium. The undesired organic impurities are defined as any organic compound capable of being readily oxidized by hypohalite or ferrate ion. This includes alcohols, aldehydes, sugars and the like. Inorganic impurities include any reducible inorganic species such as thiosulfate. The process for production of beta-ferric oxide described herein results in a product which is substantially pure in that it is substantially free of the above described impurities.

Although not a requirement, the beta-ferric oxide is preferably monohydrated rather than in an anhydrous state. Anhydrous beta-ferric oxide is difficult to produce and cannot be produced on a cost effective basis. In fact, the typical starting material for production of anhydrous beta-ferric oxide is monohydrated beta-ferric oxide and when anhydrous beta-ferric oxide comes into contact with water, it simply reacts to form monohydrated beta-ferric oxide once again. Beta-ferric oxide is preferred because it oxidizes to form ferrate faster than other iron sources and results in higher yields of ferrate than other iron sources.

The process of the present invention also requires that a chlorinated caustic solution which contains a strong alkali metal hydroxide, preferably potassium hydroxide, be present in the oxidizing reactor in order to produce the alkali metal ferrate product. In the process of the present invention, the alkali metal hydroxide, aside from being a reactant, controls the precipitation and crystallization of the ferrate product in the reactor. Such precipitation and crystallization occurs in such a manner that the ferrate product does not readily degrade, resulting in increased yields of ferrate product.

The process of the present invention requires the addition of a chlorinated caustic solution having sufficiently high concentrations, preferably from about 15 weight percent to about 45 weight percent, more preferably about 34 weight percent, of the hydroxide to permit the alkali metal ferrate to precipitate almost as quickly as it is formed.

The third reactant required for the present process is a hypohalite. The preferred hypohalites that may be employed are potassium hypochlorite or potassium hypobromite. Most preferably, the hypohalite is potassium hypochlorite.

Preferably, the hypohalite makes up from about 7 weight percent to about 18 weight percent of the chlorinated caustic solution, more preferably from about 11 weight percent to about 18 weight percent is present, and most preferably about 13 weight percent to about 18 weight percent of the chlorinated caustic solution which is added to the beta-ferric oxide in the oxidizing reactor is hypohalite.

Preferably, the molar ratio of the hypohalite ion to the ferric ion in the oxidizing reactor is from about 2:1 to about 20:1, more preferably about 5:1 hypohalite ion to ferric ion.

In another embodiment of the present invention, a ferrate stabilizing compound is added to the reaction mixture during the production of ferrate. Ferrate is a very strong oxidizer and in the presence of certain metallic and organic impurities, there may be degradation of the ferrate product. The preferred stabilizers are alkali metal iodine- or tellurium-containing salts, preferably sodium or potassium iodine- or tellurium-containing salts, such as KI, $KIO_3$, $KIO_4$, $K_3H_2IO_6$, NaI, $NaIO_3$, $NaIO_4$, $Na_3H_2IO_6$, KTe, $KTeO_3$, $KTeO_4$, $K_3H_2TeO_6$, NaTe, $NaTeO_3$, $NaTeO_4$, $Na_3H_2TeO_6$ or mixtures thereof. While it has been found that the periodate ($KIO_4$) and tellurate ($KTeO_4$) ions are especially useful stabilizers, the use of KI as a ferrate stabilizer is most preferred because it is less expensive than periodate and tellurate, and it is oxidized by hypohalite to form periodate ion in the oxidizing reactor.

Tellurium- and iodine-containing salt concentrations of from about 0.01 weight percent to about 0.06 weight percent of the reaction mixture have been found to stabilize the ferrate product. Preferably, from about 0.02 weight percent to about 0.04 weight percent potassium iodide is added to the oxidizing reactor.

Preferably, the ferrate reaction is carried out at temperatures from about 18° C. to about 25° C. for a period of time from about 1 hour to about 6 hours.

In another embodiment of the present invention, an alkali metal ferrate-containing slurry is produced and dried. A portion of the water contained in the ferrate slurry is initially removed through the use of solid/liquid separation techniques, such as filtrating or centrifuging the slurry. Preferably at least 90% of the free water is removed. As used herein, the term "free water" will mean bulk water which is not chemically incorporated within the solids. Preferably, liquid is removed through use of a basket centrifuge. After separation, a dewatered ferrate wet cake and a reusable filtrate are obtained.

The dewatered wet cake is next subjected to a gas drying step, involving the use of carbon dioxide ($CO_2$), preferably in air. Carbon dioxide is employed because the hydroxides which are present in the ferrate cake are hygroscopic and will absorb water from the air. This absorption is undesirable as it causes degradation and ferrate loss, resulting in reduced shelf life and effectiveness of the ferrate product. The dry cake preferably contains a maximum of 7 weight percent hydroxide, and more preferably from about 0 weight percent to 2 weight percent residual hydroxide after drying.

The $CO_2$ reaction of the method relating to air drying can be described by the following Equation (B):

$$2KOH + CO_2 \longrightarrow K_2CO_3 + H_2O \tag{B}$$

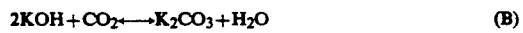

Once dried, the ferrate produced by the process of this invention has an improved shelf life and does not degrade easily. The resulting ferrate product preferably contains from about 25 weight percent to about 41 weight percent ferrate, from about 50 weight percent to about 70 weight percent chloride salt, from about 2 weight percent to about 15 weight percent carbonate salt and water and trace materials. Preferably, drying is accomplished at a temperature from about 60° C. to about 90° C. and the concentration of $CO_2$ in the drying gas is from about 0.01 volume percent to about 5 volume percent. Any method of drying using mechanical means can be employed such as fluidized-bed dryers, circulation dryers, indirect fired rotary dryers and the like.

The drying method of this invention has several advantages over that described in U.S. Pat. No. 4,606,843, by Kaczur, issued Aug. 19, 1986. In particular, the process of this invention can employ conventional solid/- liquid separation techniques rather than vacuum drying to initially dry the ferrate wet cake. Vacuum drying is more expensive, must be done in batches rather than as a continuous drying operation, and requires more complicated equipment. In addition, the process of this invention produces a dryer wet cake which results in less problems with sticking to equipment. And finally, drying by the process of this invention can be conducted at lower temperatures.

The dried ferrate product of this invention is ready for immediate use, packaging or shipment, without further preparation. If desired, the ferrate can be ground to a smaller particle size or blended with other compositions.

In another embodiment of the present invention, the filtrate which remains after solid/liquid separation is recycled for reuse in connection with the production of additional ferrate. Preferably, this filtrate contains from about 0.5 to about 5 weight percent chloride salt, from about 26 weight percent to about 38 weight percent alkali hydroxide, from about 7 weight percent to about 12 weight percent hypohalite salt and from about 0.05 weight percent to about 1 weight percent ferrate salt. The portion of this filtrate which is recycled to the ferrate production process is preferably from about 85 volume percent to about 99 volume percent of the total filtrate remaining after solid/liquid separation.

Hydroxide (e.g. from about 91 weight percent to about 98 weight percent solid alkali hydroxide, preferably from about 94 weight percent to about 98 weight percent alkali hydroxide, such as potassium hydroxide in the form of solid KOH flakes) and chlorine (e.g. $Cl_2$ gas) are added to the recycled filtrate to replenish the concentrations of hydroxide and hypohalite which were previously consumed in the ferrate reactor. Preferably, this addition occurs at a temperature from about 15° C. to about 25° C.

While the filtrate which has been reacted with hydroxide and chlorine is now suitable for reuse in the ferrate producing reaction of this invention, it is sometimes desirable to remove solid chloride salt from the filtrate. Removal of this solid can be accomplished by any solid/liquid separation process such as filtration or centrifuging. Preferably, the salt cake is removed through use of a basket centrifuge. The reusable filtrate preferably contains from about 34 weight percent to about 38 hydroxide, from about 13 weight percent to about 18 weight percent hypohalite, from about 0 weight percent to about 2 weight percent chloride salt and the remainder being mainly dissolved ferrate and water.

In accordance with a preferred embodiment of the present invention, monohydrated beta-ferric oxide, potassium hydroxide and potassium hypochlorite, along with a potassium iodide stabilizer are employed in the ferrate reactor resulting in the production of potassium ferrate according to the following Equation (C).

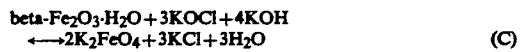

$$\text{beta-Fe}_2\text{O}_3 \cdot \text{H}_2\text{O} + 3\text{KOCl} + 4\text{KOH}$$
$$\longleftrightarrow 2\text{K}_2\text{FeO}_4 + 3\text{KCl} + 3\text{H}_2\text{O} \quad \text{(C)}$$

This embodiment is preferred as the ions of other alkali metals such as $Na^+$ will precipitate the periodate stabilizer, which is preferably added as KI, resulting in reduced yields as compared to the method of this invention using potassium hydroxide and potassium hypochlorite to produce potassium ferrate.

The ferrate produced by the process of this invention can be used in connection with any known process and for any known purpose. The ferrate produced by the process of this invention is especially useful as an oxidant, flocculant and/or coagulant. In particular, potential uses of ferrate produced by the process of this invention include the following: removal of color from industrial electrolytic baths; manufacture of catalysts for the Fischer-Tropsch process to produce reduced hydrocarbons from carbon monoxide and hydrogen; purification of hemicellulose; selective oxidation of alkenes, alkyl side chains, organic sulfur compounds, thiols, sulfinic acids, organic nitrogen compounds, carboxylic acids, halides, alcohols and aldehydes and in oxidative coupling; as a general oxidant for water, waste water and sewage treatment; disinfection as a biocide or virocide; phosphorylase inactivator; anti-corrosion paint additive; denitration of flue gas; electrodes for batteries; detoxification of cyanide and thiocyanate from waste waters; oxygen demands measurement; cigarette filters to remove HNC and carcinogenic molecules; oxidizer for hazardous wastes and other waste solutions such as from the pulp industries; pollution control in the removal of hydrogen sulfide from low pressure gas streams; removal of pollutants with mutagenic and carcinogenic characters such as naphthalene, nitrobenzene, dichlorobenzene and trichloroethylene from waste water and drinking water without coproduction of harmful products; additive to cements as structural hardener; disinfectant to inactivate E. coli, salmonella, shigella, and other fecal coliform as a bacterial cell removal step; removing streptococcus and staphylococcus; biofouling control with non-corrosive oxidant for removal of slime films formed of microorganisms such as in electric power plants and shipboard cooling systems; removal of bacteria, heavy metals and inorganics in drinking water in an oxidation coagulation processes; removal of hydrogen sulfide from sour gas in the "Knox" process; delignification of agricultural residues to produce glucose and ethanol from wheat straw; magnetic filler of barium and strontium ferrate for flexible plastics having high polymer binder contents; support for other oxidizers such as chromium (VI) and $KMnO_4$; denitrification of sinter furnace off-gas; removal of impurities from solutions fed to zinc plants; decontamination of waste waters containing cyanide and thiocyanate; oxidative destruction of phenol, sulfite and thiosulfate; as a catalyst in burning of coal to remove impurities in steam gasification step; component of grinding wheels; etching agent in fluid form for evaporated films; and ceramic encapsulated rare earth metal ferrates for use in electronics where ferromagnetic properties are needed.

PRODUCTION OF BETA-$Fe_2O_3$

In accordance with one embodiment of the present invention, an improved method for producing high purity, stable monohydrated beta-$Fe_2O_3$ is provided. Monohydrated beta-$Fe_2O_3$ produced by the process of this invention can be employed in any known composition or process where monohydrated beta-$Fe_2O_3$ is required or preferred, such as a pigment or filler in paints and the like. This improved monohydrated beta-$Fe_2O_3$ is preferably used in connection with the production of alkali metal ferrates as described above.

The reactions relating to the formation of monohydrated beta-$Fe_2O_3$ can be illustrated by the following Equations D and E:

$$2Fe_3 + 6OH^- \leftrightarrow Fe_2O_3 \cdot H_2O + 2H_2O \quad (D)$$

$$2Fe_3 + H_2O + 3CO_3{}^{2-} \leftrightarrow Fe_2O_3 \cdot H_2O + 3CO_2 \quad (E)$$

As can be seen from these Equations, beta-ferric oxide is produced pursuant to the reaction of a ferric salt, such as $FeCl_3$, $Fe(SO_4)_3$ and $Fe(NO_3)_3$, preferably $FeCl_3$, and a base such as a carbonate salt (e.g. $K_2CO_3$ and $Na_2CO_3$) or hydroxide (e.g. NaOH and KOH). Preferably, $K_2CO_3$ is employed because the resulting monohydrated beta-$Fe_2O_3$ is more chemically stable than when strong hydroxides or other carbonates are used.

In general, beta-ferric oxides are meta-stable. The presence of even small amounts of alpha-ferric oxide impurities results in the gradual transformation of beta-ferric oxide to the more stable alpha-ferric oxide crystalline form. A method of producing substantially pure beta-ferric oxide is therefore desirable as it will not degrade as readily to alpha-ferric oxide.

In general, if the reaction of Equation D or E is carried out at a temperature of about 50° C. or less, the resulting ferric oxide produced will be at least partially alpha-ferric oxide. If carried out above about 50° C., preferably at from about 55° C. to about 85° C., predominantly monohydrated beta-ferric oxide will result. In accordance with a preferred embodiment of this invention, the production of beta-ferric oxide is carried out at a temperature from about 55° C. to about 80° C., most preferably from about 65° C. to about 75° C., for a period of about 0.1 hours to 0.5 hours.

The term "substantially pure beta-$Fe_2O_3$" as used herein is defined as beta-ferric oxide which contains no more than 3000 parts per million by weight of total harmful metallic impurities and undesirable organic and inorganic impurities, which can cause decomposition of alkali metal ferrates. Preferably, the amount of impurities is less than about 1000 parts per million of total impurities.

It has been discovered that use of a strong oxidizing agent in the production of beta-$Fe_2O_3$ results in the removal of reducible impurities such as $Fe_{2+}$ and the formation of substantially pure monohydrated beta-$Fe_2O_3$. Preferably, $KIO_4$ is employed as the oxidizing agent. In a preferred embodiment, a basic feed includes a base and from about 0.05 weight percent to about 0.3 weight percent strong oxidizing agent.

In a preferred embodiment, other impurities present in the monohydrated beta-ferric oxide produced according to the above Equations D and E are removed. Such impurities may consist of heavy metallic impurities such as copper, cobalt and nickel. In particular, monohydrated beta-$Fe_2O_3$ is preferably produced in the presence of a phosphate, preferably $K_3PO_4$, which complexes with some of the harmful metal impurities and retains such impurities in the liquid phase, thereby resulting in substantially pure monohydrated beta-$Fe_2O_3$. In a preferred embodiment, the basic feed includes from about 0.02 weight percent to about 0.2 weight percent phosphate. Examples of phosphates which can be employed include monoorthophosphate ($KH_2PO_4$), diorthophosphate ($K_2HPO_4$), triorthophosphate ($K_3PO_4$) as well as other phosphate salts which form the orthophosphate ion in basic solution.

In another preferred embodiment, an inorganic acid, preferably hydrogen chloride (HCl), is added to the ferric-containing feed. The inorganic acid is preferably added to the ferric-containing feed before the reaction starts. The advantage of adding an inorganic acid is that it dissolves many of the insoluble hydrolysis products (i.e., metal or iron hydrated oxides or hydroxides) which are typically present in the ferric feed. These solids tend to drive the reaction in the wrong direction, and result in forms of ferric oxide other than the desired beta-ferric oxide. Therefore, dissolving the insoluble hydrolysis products with an inorganic acid reduces this problem. Preferably, the inorganic acid comprises from about 0.1 weight percent to about 1.5 weight percent of the ferric-containing feed and more preferably comprises from about 0.2 weight percent to about 0.6 weight percent of the ferric-containing feed.

It is preferable that the ferric-containing feed initially include from about 5 weight percent to about 60 weight percent ferric salt, most preferably about 41 weight percent ferric salt. To this ferric-containing feed is added an aqueous basic feed solution containing from about 5 weight percent to about 50 weight percent carbonate or hydroxide salt, most preferably from about 45 weight percent to about 50 weight percent carbonate or hydroxide salt. Preferably, the carbonate salt is $K_2CO_3$ and the ferric salt is $FeCl_3$. Preferably, the formation of monohydrated beta-$Fe_2O_3$ is carried out at a pH above about pH 9, more preferably above about pH 10.

In a preferred embodiment, the basic feed is added to the ferric-containing feed at a measured volumetric flow rate. Preferably, about 50 weight percent $K_2CO_3$ solution is added to about 41 weight percent $FeCl_3$ solution at a flow rate from about 1 liter of $K_2CO_3$ per minute per 454 kilograms of FeC13 solution to about 100 liters of $K_2CO_3$ solution per minute per 454 kilograms of $FeCl_3$ solution. Most preferably, about 45 weight percent $K_2CO_3$ solution is added to 41 weight percent $FeCl_3$ solution at a flow rate of about 30 liters of $K_2CO_3$ per minute per 454 kilograms of $FeCl_3$ solution until there is a slight stoichiometric excess of $K_2CO_3$.

In a preferred embodiment of the process of this invention, monohydrated beta-$Fe_2O_3$ is filtered from the reaction mixture, preferably through the use of a centrifugal decanter, leaving a dewatered concentrated ferric oxide slurry. Preferably, the concentration of beta-ferric oxide in the dewatered wet cake is from about 8 weight percent to about 33 weight percent beta-ferric oxide, most preferably from about 30 weight percent to about 33 weight percent beta-ferric oxide in a solution of from about 25 weight percent to about 30 weight percent dissolved KCl and about 0.1 weight percent dissolved $K_2CO_3$.

The beta-ferric oxide produced in accordance with this invention is advantageously used in the production of alkali metal ferrate by the method of this invention as it is superior to other sources of iron. In particular, the beta-ferric oxide produced in accordance with this invention is superior because it is low in impurities which would be carried through to the ferrate product.

EXAMPLE OF A PREFERRED EMBODIMENT

A preferred embodiment of this invention is the continuous process illustrated in the FIGURE. Referring to the FIGURE, a feed 4 of about 50 weight percent $K_2CO_3$ solution is introduced into a ferric oxide reactor 10 which contains an initial charge of about 41 weight percent $FeCl_3$ solution and about 0.2 weight percent to about 0.6 weight percent HCl. A suitable ferric oxide reactor 10 is a polypropylene tank with a titanium steam spiral-wound heating coil and titanium agitator mixer.

The feed 4 of $K_2CO_3$ solution is added to the ferric oxide reactor 10 until a slight stoichiometric excess of $K_2CO_3$ is achieved. A feed 6 of $K_3PO_4$ and a feed 8 of $KIO_4$ are introduced into the ferric oxide reactor 10 by dissolution into the feed 4 of $K_2CO_3$ solution.

The ferric oxide reactor 10 is heated to obtain a reaction temperature of from about 65° C. to about 70° C. The resulting first reaction product mixture 12 is transferred to a centrifugal decanter 14. Dissolved KCl as liquid stream 15 is removed through centrifugation of the first reaction product mixture 12 leaving a concentrated slurry 16. The slurry 16 contains about 20 weight percent to about 30 weight percent monohydrated beta-ferric oxide. The slurry 16 is transferred to a ferrate reactor 18. The ferrate reactor 18 can be made of various corrosion-resistant materials, such as titanium, and should include cooling and agitating mechanisms. To the ferrate reactor 18, is added a chlorinated caustic solution 38 which includes about 34 weight percent KOH, from about 17 weight percent to about 18 weight percent KOCl, about 2 weight percent KCl, about 0.3 weight percent KI and about 46 weight percent $H_2O$. The molar ratio of hypohalite to iron in the ferrate reactor 18 is about 5:1. The beta-ferric oxide/-chlorinated caustic solution mixture in the ferrate reactor 18 is cooled to a temperature of about 20° C. and allowed to react for a period from about 2 hours to about 6 hours to produce a ferrate slurry 20.

The ferrate slurry 20 is then transferred to a basket centrifuge 22. The basket centrifuge 22 may be a stainless steel centrifuge as contact time with the corrosive ferrate slurry 20 is short. The ferrate slurry 20 is centrifuged resulting in a filtrate 30 and a $K_2FeO_4$ wet cake 24.

After centrifuging, the filtrate 30 is recycled and the $K_2FeO_4$ wet cake 24 is placed in an air dryer 26. A fluid bed dryer of stainless steel can be used where heated air is passed through a screen on which the wet cake 24 is placed. Any fine dust which forms can be captured in an overhead dust bag on the dryer through which air flows.

The wet cake 24 is dried through the use of a 60° C. to a 90° C. stream of air containing about 0.01 volume percent to about 5 volume percent carbon dioxide in the dryer 26 leaving a $K_2FeO_4$ dry cake 28 containing from about 25 weight percent to about 41 weight percent $K_2FeO_4$, about 50 weight percent to about 70 weight percent KCl and from about 2 weight percent to about 15 weight percent $K_2CO_3$ and $H_2O$. After drying, portions of the dry cake 28 which are hard and lumpy can be reduced in size through the use of a crusher-grinder with agitating blades to produce a fine powder.

The filtrate 30 which consists of from about 0.05 weight percent to about 1.0 weight percent $K_2FeO_4$, from about 7 weight percent to about 12 weight percent KOCl, from about 26 weight percent to about 38 weight percent KOH and from about 0.5 weight percent to about 5 weight percent KCl can be recycled. Before recycling, from about 1 volume percent to about 15 volume percent of the filtrate 30 is removed as bleed 40. The filtrate 30 which is recycled, is combined with from about 91 weight percent to about 94 weight percent solid KOH flake and $Cl_2$ gas in a chlorinated caustic filtrate reactor 32 to produce a second reaction mixture 34.

The second reaction mixture 34 is placed in a basket centrifuge 36. Centrifugation results in removal of a KCl salt cake 42 leaving a chlorinated caustic solution 38 which is about 34 weight percent KOH, from about 17 to about 18 weight percent KOCl, about 2 percent KCl, about 0.3 weight percent KI and about 46 weight percent $H_2O$. This reusable filtrate 38 can be used in connection with the further production of ferrate in the ferrate reactor 18. The KCl salt cake 42 which remains after centrifugation can be disposed of or utilized for any known purpose.

EXAMPLE 1

The following procedure was employed to illustrate the advantage of the use of potassium iodide, KI, in the ferrate reactor in the process of this invention as opposed to the production of ferrate without using KI as a ferrate stabilizer. First, a chlorinated caustic solution was prepared by dissolving 98.9 grams of 91 weight percent solid KOH flake in 201.1 grams of water. A plastic tube connected to a chlorine gas cylinder was inserted into the KOH solution. Chlorine gas was bubbled into the KOH solution until the weight percent of KOH in the solution was lowered to 5 weight percent. During chlorination, the temperature of the KOH solution was maintained at between 8° C. and 24° C. through use of a temperature controlled water bath. An additional amount of about 210 grams of 91 weight percent solid KOH flake was added to the solution while cooling was continued to maintain the temperature at 25° C. After the KOH flake dissolved, the solution was filtered on a glass vacuum filter with an about 10 to about 15 micron pore size. After filtration, the filtrate was analyzed to contain about 33.6 weight percent KOH and about 13.8 weight percent KOCl. The resulting KCl wet salt cake was discarded.

The chlorinated caustic solution was placed in a beaker and mixed by using an overhead plastic flat-blade impeller rotating at approximately 100 rotations per minute. Reagent grade potassium iodide (0.039 grams) was dissolved in about 0.5 milliliter of deionized water and mixed into the chlorinated caustic solution. About 15.8 grams of beta-ferric oxide wet cake containing 19.3 weight percent iron was added to the chlorinated caustic solution while the solution was maintained at a temperature of 25° C. The beta-ferric oxide cake became dispersed throughout the solution forming a slurry. The reaction was allowed to proceed for one hour at 25° C. with continuous stirring.

Several grams of the reaction product slurry was removed and filtered on a laboratory vacuum filter equipped with a polypropylene filter cloth leaving a wet product cake. The wet product cake was black-gray in color and was immediately analyzed for weight percentage of $K_2FeO_4$. The wet product cake was then air dried at a temperature of about 25° C. for a period of 18 hours and again analyzed for weight percentage of $K_2FeO_4$. The remaining reaction slurry was allowed to react for another hour with stirring and several grams of the reaction slurry were removed and again filtered on the laboratory vacuum filter with polypropylene filter cloth. The resulting wet product cake was again analyzed for weight percentage of $K_2FeO_4$.

For comparison purposes, the identical procedure was followed without the addition of any potassium iodide. It was noted that without potassium iodide, the reaction mixture exhibited massive foaming and gas generation in the slurry after 15 minutes of reaction time as compared to little foaming and gas generation in the presence of KI. In addition, the wet product cake was gray-brown in color rather than the darker black-gray cake produced in the presence of KI. The results, with and without potassium iodide at varying lengths of reaction time are shown in Table I below:

TABLE I

| | 0.039 grams KI | | Without KI | |
|---|---|---|---|---|
| | 1 hr. | 2 hrs. | 1 hr. | 2 hrs. |
| Measured Weight % $K_2FeO_4$ | 39.1 | 31.7 | 24.8 | 16.3 |
| Measured Weight % $K_2FeO_4$ after 18 hrs. drying | 39.1 | | 16.5 | |
| Measured Weight % Total Fe | 11.3 | 10.2 | 10.2 | 8.4 |
| Calculated Weight % of Fe in $K_2FeO_4$ | 11.0 | 8.9 | 7.0 | 4.6 |
| Calculated Weight % $Fe_2O_3 \cdot H_2O$ | 0.43 | 2.0 | 5.1 | 6.0 |
| Percentage of Total Fe Present as $K_2FeO_4$ | 97.3 | 87.6 | 68.6 | 54.7 |

A comparison of the results listed in Table I indicates that when ferrate is synthesized by the reaction of beta-ferric oxide, potassium hypochlorite and potassium hydroxide, it is stabilized by the addition of potassium iodide. This is shown by the decrease in foaming and gas generation which occurs when potassium iodide is added, indicating that the ferrate degradation reaction is largely eliminated in the presence of KI. This is also shown by the much higher $K_2FeO_4$ assays in the wet cake products taken at one and two hours into the reaction and by the dried product taken at one hour. Moreover, the potassium ferrate purity of the products produced in the presence of potassium iodide is much higher, as measured by the percentage of iron in the products which is ferrate rather than ferric oxide.

EXAMPLE 2

The following procedure was employed to illustrate the advantage of the use of beta-ferric oxide in the ferrate reactor as compared to other crystalline forms of ferric oxide. Four distinct crystalline forms of monohydrated iron(III) oxide were synthesized in the laboratory for testing as iron feed materials. These synthesized crystalline forms, alpha ($\alpha$), beta ($\beta$), delta ($\delta$) and gamma ($\gamma$), along with reagent-grade ferric chloride hexahydrate ($FeCl_3 \cdot 6H_2O$) were tested in ferrate reactions under the same reaction conditions in each test. All ferrate synthesis reactions were performed using an initial molar ratio of 10-to-1 of sodium hypochlorite to iron in the iron feed materials. All ferrate synthesis reactions were performed at temperatures of about 20° C. to about 22° C. with vigorous mixing of the same type in all tests. The reactions were performed for a period of 2 hours under these conditions. In each test, the product slurries were then filtered using a diatomaceous earth pre-coat material on a glass filter for between 1.5 to 3.5 hours to obtain complete filtering.

The monohydrated beta-ferric oxide material was synthesized by preparing a solution of 500 milliliters of 0.2 molar reagent-grade $FeCl_3 \cdot 6H_2O$ in deionized water at a temperature of 25° C. The solution was slowly stirred and heated to a temperature of 80° C. over a period of about five hours. The resulting light slurry of monohydrated beta-ferric oxide was digested by continuing to maintain its temperature at 80° C. for two more hours with slow stirring. The slurry was then removed from the heat and the slow stirring was stopped. The slurry was allowed to slowly cool to 25° C. and settle by gravity for about 18 hours. The clarified supernatant liquid was decanted, and the thickened slurry of monohydrated beta-ferric oxide was used as seed material for a much larger volume of beta-ferric oxide synthesis.

Four liters of 0.2 molar reagent-grade $FeCl_3 \cdot 6H_2O$ in deionized water was prepared. This solution was slowly stirred and slowly heated to 80° C. over a five hour period of time. When the solution had reached about 62° C., the thickened slurry of monohydrated beta-ferric oxide seed material was added to the solution. When the slurry reached a temperature of 80° C., digestion with slow stirring at this temperature was continued for two more hours. The slurry was then removed from the heat and the slow stirring was stopped. The slurry was allowed to slowly cool to 25° C. and settle by gravity for about 18 hours. About 2800 milliliters of supernatant liquid was decanted off. The remaining thickened slurry was filtered on a 10–15 micron glass filter under vacuum, resulting in a wet filter cake of monohydrated beta-ferric oxide. The wet filter cake was allowed to dry by exposure to laboratory air for about 24 hours, and then was analyzed as including 52.0 weight percent iron and 82.7 weight percent monohydrated beta-$Fe_2O_3$.

Chlorinated caustic filtrate solutions were prepared by a standard method for all forms of ferric oxide and for $FeCl_3 \cdot 6H_2O$. In particular, at about 15° C. to about 25° C., chlorine gas was passed through an about 30 weight percent to about 50 weight percent NaOH solution while cooling and stirring, until most of the NaOH in the solution was consumed resulting in a slurry of NaOCl and NaCl. Reagent-grade 99.5 weight percent NaOH pellets were dissolved into the slurry while cooling and mixing until the slurry reached a concentration of about 20 weight percent to about 30 weight percent NaOH. The concentrated slurry was filtered on a 40 micron to 50 micron pore size glass filter under vacuum, obtaining a predominantly NaCl-containing filter cake which was discarded, and a clarified filtrate. The clarified chlorinated caustic filtrate was analyzed for weight percent NaOCl and weight percent NaOH just prior to its use in the ferrate synthesis reactions. The specifics for each iron source are summarized in Table II.

The synthesized monohydrated beta-ferric oxide material was then used in a laboratory reaction in the synthesis of a sodium ferrate solution. About 600 grams of chlorinated caustic filtrate which contained 16.2 weight percent NaOCl and 23.9 weight percent NaOH was placed into a beaker, and mixed by use of an overhead plastic flat-blade impeller which rotated at about 100 rotations per minute. Monohydrated beta-ferric oxide in an amount of 14.0 grams which was analyzed as containing 52.0 weight percent iron was added all-at-once to the stirring solution at a maintained temperature of 20° C. No significant or fast temperature rise of the reaction contents was noted during the reaction time. The beta-ferric oxide solids rapidly dispersed throughout the solution, forming a slurry. The reaction mixture was allowed to react under these conditions for 2 hours. A filter was prepared by pouring about 25 grams of a diatomaceous earth pre-coat material slurried in about 50 milliliters of deionized water into the filter while vacuuming, resulting in a uniform cake of the pre-coat material on the top of the glass filter surface. At the end of 2 hours of reaction time, 591.4 grams of the slurry was carefully poured into the pre-coat surface and the vacuum was applied for about 2.5 hours to ensure complete filtration.

The filtrate was a deep purple color, weighed 499.3 grams, and was analyzed as including 3.14 weight percent $Na_2FeO_4$, 10.86 weight percent NaOCl, and 22.1 weight percent NaOH. The wet filter cake weighed 95.8 grams and was analyzed as including 2.24 weight percent NaOCl and 13.41 weight percent NaOH. It should be noted that when sodium ferrate ($Na_2FeO_4$) is produced, the majority remains in the filtrate and when potassium ferrate ($K_2FeO_4$) is produced, most of it precipitates and is recovered in the filter cake.

The above procedure was repeated for the remaining crystalline forms of ferric oxide and $FeCl_3 \cdot 6H_2O$. The following Tables II and III illustrate the results of this procedure using the various crystalline forms and $FeCl_3 \cdot 6H_2O$:

TABLE II

|  | Monohydrated alpha-$Fe_2O_3$ | Monohydrated beta-$Fe_2O_3$ | Monohydrated gamma-$Fe_2O_3$ | Monohydrated delta-$Fe_2O_3$ | $FeCl_3 \cdot 6H_2O$ |
|---|---|---|---|---|---|
| Chlorinated Caustic Filtrate | 533.9 grams | 600 grams | 600 grams | 600 grams | 600 grams |
| Caustic Filtrate Weight % NaOCl | 16.2 | 16.2 | 15.8 | 16.0 | 16.2 |
| Caustic Filtrate Weight % NaOH | 25.7 | 23.9 | 25.5 | 26.2 | 23.9 |
| Iron Product Weight | 21.8 grams | 14.0 grams | 20.2 grams | 11.75 grams | 35.2 grams |
| Weight % Fe in Ferric Oxide | 29.7 | 52.0 | 35.2 | 61.3 | — |
| 2 hour slurry Weight | 541.7 grams | 591.4 grams | 593.0 grams | 573.6 grams | 621.2 grams |
| Filtrate Weight | 451.6 grams | 499.3 grams | 453.6 grams | 500.0 grams | 495.9 grams |
| Filtrate Weight % $Na_2FeO_4$ | 0.46 | 3.14 | 0.2 | 0.022 | 3.4 |
| Filtrate Weight % NaOCl | 12.8 | 10.86 | 7.66 | 14.1 | 10.6 |
| Filtrate Weight % NaOH | 20.1 | 22.1 | 23.3 | 23.6 | 17.1 |
| Wet Filter Cake Weight | 87.5 grams | 95.8 grams | 139.4 grams | 71.4 grams | 121.2 grams |
| Filter Cake Weight % NaOCl | 4.32 | 2.24 | 0.17 | 3.61 | .81 |
| Filter Cake Weight % NaOH | 8.2 | 13.41 | 14.1 | 3.11 | 6.8 |

TABLE III

Sodium Ferrate ($Na_2FeO_4$) 2-Hour Synthesis Reaction Test Results Using Iron Feed Candidates at 20°–22° C. and 10:1 Initial Molar Ratio $OCl^-$ to $Fe^{+3}$ and 2–3 Hour Filtration Times

| Iron Feed Candidate | Ferrate-Degrading Trace Metals in Iron Feed Candidates | | | | | | | Filtrate Wt % $Na_2FeO_4$ | Filtrate % Yield $Na_2FeO_4$ Based on Fe in Feed | % Pass Yield $FeO_4$ Based on Measurable: | | Observations |
|---|---|---|---|---|---|---|---|---|---|---|---|---|
| | ppm in Fe Feed | | | % Fe in Feed | grams/$10^6$ grams Fe | | | | | NaOCl | NaOH | |
| | Cu | Co | Ni | | Cu | Co | Ni | | | | | |
| $\beta$-$Fe_2O_3$ | 11 | 17 | 7 | 52.0 | 21 | 33 | 13 | 3.14 | 75 | 28 ± 11 | 49 ± 20 | No exotherm. Slight foaming. Dark purple-black filtrate. |
| $\alpha$-$Fe_2O_3$ | 36 | 13 | 18 | 29.7 | 121 | 44 | 61 | 0.46 | 11 | 6 ± 2.4 | 2.1 ± 0.8 | No exotherm. Dark brown throughout reaction. Slight purple filtrate. Foaming. |
| $\delta$-$Fe_2O_3$ | 17 | 38 | 85 | 61.3 | 28 | 62 | 139 | 0.02 | 0.5 | 0.4 ± 0.16 | 0.2 ± 0.1 | No exotherm. Dark brown throughout reaction. Slight purple filtrate. Foaming. |
| $\gamma$-$Fe_2O_3$ | — | — | — | 35.2 | — | — | — | 0.2 | 4.5 | 1.1 ± 0.4 | 2.1 ± 0.8 | No exotherm. Dark brown throughout reaction. Slight purple filtrate. Foaming. |
| $FeCl_3 \cdot 6H_2O$ (Hexahydrate) | 8 | 21 | 21 | 20.6 | 39 | 102 | 102 | 3.4 | 79 | 27 ± 11 | 43 ± 17 | Exotherm to 26° C. Foaming. Dark purple-black filtrate. |

While the results indicate that satisfactory yields of ferrate are produced when $FeCl_3 \cdot 6H_2O$ is employed, the use of $FeCl_3 \cdot 6H_2O$ results in excessive heat generation which can lead to degradation of ferrate and the hypohalite. In addition, the use of FeCl₃·6H₂O results in excessive generation of byproduct salt leading to lower ferrate assays.

EXAMPLE 3

The following procedure was employed to produce a ferrate product using an electrochemical cell. A laboratory-scale electrochemical cell consisting of two chambers separated by a Nafion ™ perfluorinated sulfonate cation exchange membrane was assembled by clamping the two chambers together with a metal frame. Each chamber had a rectangular compartment which measured about 5 centimeters by 5 centimeters by 2.5 centimeters in thickness with total volume against the membrane of about 62.5 milliliters. Electrodes made of high-purity nickel metal were placed into each chamber about 0.32 centimeters from the membrane surfaces. The electrodes were 0.32 centimeters by 0.64 centimeters in size and of diamond-shaped expanded metal mesh, with exposed surface area to the membrane of 10.2 square centimeters.

A solution of 53 weight percent NaOH and 0.5 weight percent NaCl was prepared using reagent-grade chemicals and 50 milliliters of the solution was placed into the catholyte compartment of the electrochemical cell at a temperature of 25° C. A slurry was prepared from this solution by mixing a wet filter cake of monohydrated beta-ferric oxide which was analyzed to contain 38.7 weight percent iron in the solution such that the slurry was about 0.36 weight percent beta-Fe₂O₃, 53 weight percent NaOH and 0.5 weight percent NaCl. About 50 milliliters of this slurry was then placed into the anolyte compartment of the cell at a temperature of 25° C. The cell anolyte slurry was mixed thoroughly using a teflon-coated magnetic stirring bar to keep the beta-Fe₂O₃ slurry well suspended and constantly in contact with the nickel mesh anode. A current power supply was used to apply a constant current of 0.3 kiloamperes per square meter of projected electrode surface area (0.77 amperes). The cell was heated by teflon-coated stainless-steel immersion heaters to maintain an appropriate anolyte temperature of about 50° C. The cell was operated for 3.25 hours. During this period of time, gas evolution was observed from each electrode and a visible darkening over time of the yellow-tan anolyte slurry was observed. Samples of the cell anolyte slurry were drawn after 155 minutes and 195 minutes and were filtered on a 40 micron to 50 micron pore size glass filter under vacuum. The filtrate was purple in color and was analyzed for weight percent Na₂FeO₄.

The results from operation of the electrochemical cell using a monohydrated beta-ferric oxide feed to the anode show that ferrates can be synthesized using monohydrated beta-ferric oxides as a feed to a stable anodic material in an electrochemical cell. These results are summarized in Table IV.

the use of iron (Fe) metal as an anode feed due to the fact that only half as much electric power is theoretically consumed for the ferric oxide reaction as is theoretically consumed by the iron metal reaction. For comparison purposes, the electrochemical cell reactions using beta-Fe₂O₃ are shown by Equations F and the reactions using iron (Fe) metal are shown as Equations G:

Anode reaction:

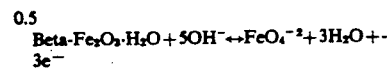

Cathode reaction:

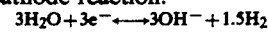

Overall reaction:

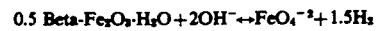                                                (F)

Anode reaction:

Cathode reaction:

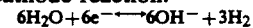

Overall reaction:

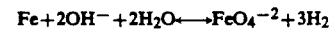                                                (G)

EXAMPLE 4

The following procedure was utilized to illustrate the efficiency of the process of this invention directed to drying of the ferrate wet product. A laboratory basket centrifugal filter operating at about 500 rotations per minute using an Eimco ™ filter cloth on a 12.7 centimeter basket was used to separate a K₂FeO₄ wet cake from a ferrate reaction slurry as prepared by the preferred methods of this invention. The wet cake was removed from the filter basket and analyzed to include about 37.0 weight percent K₂FeO₄ and about 45.2 weight percent KCl. Using the analytical results on the filtrate, the remaining materials in the wet cake were estimated to be about 1.4 weight percent potassium hypochlorite KOCl, about 6.2 weight percent KOH and about 10.2 weight percent H₂O.

A drying apparatus was constructed which consisted of a cylindrical steel drying chamber with a diameter of 9.6 centimeters and a length of 8.5 centimeters. The metal cylinder drying chamber was connected to a motorized system which caused the drying chamber to rotate at approximately 60 rotations per minute. The drying chamber was also placed in contact with a heated sand bath in order to heat and control the temperature of the drying chamber. The chamber was

TABLE IV

| Time (minutes) | Current Density (kA/m²) | Cell Voltage (Volts) | Temperature (°C.) | Filtrate Weight % Na₂FeO₄ Anolyte | Estimated Current Efficiency % to Na₂FeO₄ | Estimated Weight % Na₂FeO₄ Yield |
|---|---|---|---|---|---|---|
| 0   | 0.3 | 19   | 49 |       |     |     |
| 60  | 0.3 | 17   | 60 |       |     |     |
| 155 | 0.3 | 20.5 | 53 | 0.019 | 0.4 | 3.0 |
| 195 | 0.3 | 21.2 | 50 | 0.029 | 0.4 | 4.3 |

The use of monohydrated beta-ferric oxide as an anode feed in an electrochemical reactor is superior to equipped with a center hole which allowed for insertion of a plastic tube for compressed air at a temperature of about 25° C. to flow into and out of the chamber.

The dryer apparatus was pre-heated while rotating and the sand bath temperature was measured to be 125° C. About 50.0 grams of black-colored 37.0 weight percent $K_2FeO_4$ wet cake was loaded into the dryer chamber. The dryer chamber was rotated and tumbling of the wet cake occurred. Air flow into the chamber was started and maintained at a rate of about 1000 cubic centimeters per minute. A thermometer was suspended into the drying chamber and the temperature of the sand bath was adjusted such that the temperature of the air with the tumbling $K_2FeO_4$ wet cake product in the chamber was maintained at about 82° C. The drying operation was continued under these conditions for 1 hour. The $K_2FeO_4$ wet cake product was observed to form wet round masses which fell apart into a free-flowing dry powder as water was removed.

At the end of 1 hour of operation, a dry powdered product was recovered which weighed 44.4 grams, and was analyzed to include 41.0 weight percent $K_2FeO_4$ and 5.2 weight percent $K_2CO_3$. From mass balance calculations completed based on this data, the remaining materials in the dry product were calculated to be about 2.4 weight percent KOH, 50.9 weight percent KCl and 0.5 weight percent $H_2O$. This data represents removal of about 96.0 percent of the water in the wet cake, and about 61 percent of the KOH in the wet cake was converted to $K_2CO_3$. Only about 1.6 percent of the ferrate was lost in the drying operation.

EXAMPLE 5

A stable monohydrated beta-ferric oxide material was synthesized by the following method. About 200 grams of water-treatment grade 41 weight percent ferric chloride ($FeCl_3$) was placed into a beaker resting on a temperature-controlled heating plate. Slow mixing at about 30 rotations per minute was started using an overhead polyethylene flat-blade impeller and 2 milliliters of concentrated industrial-grade 36.5 weight percent hydrochloric acid (HCl) was added and dissolved. In a separate beaker, 238.6 grams of a solution which was about 45 weight percent potassium carbonate ($K_2CO_3$) was made by dissolving 107.1 grams of technical-grade 99.9 weight percent $K_2CO_3$, 0.2 grams of technical-grade 99.5 weight percent potassium triorthophosphate ($K_3PO_4$) and 0.4 grams of reagent-grade 99.7 weight percent potassium meta-periodate ($KIO_4$) into 130.9 grams of deionized water.

A teflon-coated thermometer was suspended into the ferric chloride solution while mixing was continued, and the heating plate was turned on. The temperature of the ferric chloride solution was brought to 65° C. and was controlled throughout the synthesis to remain between 65° C. and 70° C. Using a peristaltic pump, the potassium carbonate solution was added to the ferric chloride solution at a rate of about 12 milliliters per minute until all of the solution was added, about 15 minutes. The resulting slurry was removed from the heat and mixing was stopped. The slurry was then centrifuged using a high-speed swing-out horizontal centrifuge with a 14-inch diameter rotor by placing the slurry into 500 milliliter glass bottles and centrifuging for 12 minutes at 2500 rotations per minute. This operation simulates use of high-speed industrial centrifugal decanter equipment. The decantant fluid was clear, free of suspended solids and was discarded. The yellow-tan beta-$Fe_2O_3$ wet cake was analyzed to be 12.0 weight percent iron (Fe) and 19.1 weight percent $Fe_2O_3$.

The synthesized monohydrated beta-ferric oxide material was immediately tested in a laboratory reaction in the synthesis of a potassium ferrate dry powder product. A chlorinated caustic filtrate solution was synthesized by the method given in Example 2 and was analyzed as including 32.2 weight percent potassium hydroxide (KOH) and 13.7 weight percent potassium hypochlorite (KOCl). About 1042 grams of this solution was placed into a beaker and mixed by use of an overhead polyethylene flat-blade impeller which rotated at about 100 rotations per minute. Potassium iodide (KI) in an amount of 0.261 grams was dissolved in about 1 milliliter of deionized water and this KI solution was added to the chlorinated caustic solution.

The beta-$Fe_2O_3$ wet cake which weighed 147 grams was added all-at-once to the chlorinated caustic solution while stirring was continued and the temperature of the solution was maintained at 25° C. The beta-$Fe_2O_3$ solids rapidly dispersed throughout the solution, forming a slurry. The reaction mixture was allowed to react under these conditions for 5 hours. A vacuum filter which was equipped with an Eimco TM polypropylene filter cloth was used to filter 1022.5 grams of the reaction slurry after the reaction was complete. The filtrate obtained, which weighed 962 grams, was analyzed as containing 30.8 weight percent KOH and 8.2 weight percent KOCl. The remaining wet cake was grey in color, weighed 90.4 grams, was analyzed to contain 54.2 weight percent $K_2FeO_4$. The $K_2FeO_4$ wet cake was dried in an air-circulation oven for 30 minutes at a temperature of 85° C. The final dried cake was analyzed to contain 55.6 weight percent $K_2FeO_4$ and 1.8 weight percent $Fe_2O_3$. The experimental results were used to calculate the following yields on the process: 91.1 percent yield of $K_2FeO_4$ based on beta-$Fe_2O_3$ fed, and 72.0 percent yield of $K_2FeO_4$ based on KOCl consumed in the reaction process.

A sample of the wet cake product of beta-$Fe_2O_3$ which was synthesized by the above method was stored for at least six weeks at about 26° C. in a plastic jar which was open to atmospheric air for a substantial portion of the time. At the end of this period of time, the wet cake of beta-$Fe_2O_3$ was observed to have maintained the same yellow-tan color which it possessed just after it was synthesized. The stored product was analyzed, and shown to contain 23.0 weight percent iron (Fe) and 36.6 weight percent $Fe_2O_3$ and was then tested in a laboratory reaction in the synthesis of potassium ferrate dry powder product.

Again, by the method given in Example 2, a chlorinated caustic filtrate solution was synthesized which was analyzed to contain 13.0 weight percent KOCl and 34.0 weight percent KOH. About 85 grams of this chlorinated caustic solution was placed into a beaker and mixed by use of an overhead polyethylene flat-blade impeller. The beta-$Fe_2O_3$ material in an amount of 6.0 grams was then added all-at-once to the chlorinated caustic solution while stirring and the temperature was maintained at 25° C. The beta-$Fe_2O_3$ solids rapidly dispersed throughout the solution, forming a slurry. The reaction mixture was allowed to react under these conditions for 2.5 hours. Using the vacuum filter apparatus described above, 82.6 grams of the resulting reaction slurry was filtered. The filtrate obtained which weighed 72.9 grams was analyzed to contain 8.6 weight percent KOCl and 32.2 weight percent KOH. The wet cake obtained was grey in color, weighed 9.7 grams and was dried by warm air circulation across the surface of the material in a vented fume hood for about 18 hours. The final dried cake was analyzed to indicate 43.2 weight percent $K_2FeO_4$ and 1.0 weight percent $Fe_2O_3$. These experimental results were used to calculate the following yields on this process: 94.5 percent yield of $K_2FeO_4$ based on beta-$Fe_2O_3$ fed to the process, and 76.1 percent yield of $K_2FeO_4$ based on KOCl consumed in the reaction process, assuming no losses of ferrate in the drying process used in this experiment.

For comparison purposes, a monohydrated beta-ferric oxide material was then synthesized by the following method in which HCl, $K_3PO_4$ and $KIO_4$ were not employed. About 100 grams of water-treatment grade 41 weight percent ferric chloride ($FeCl_3$) solution was mixed with 156 grams of deionized water, resulting in 256 grams of about 16 weight percent $FeCl_3$ solution. This solution was placed into a beaker resting on a temperature-controlled heating plate, and fast mixing using a teflon-coated magnetic stirring bar was started. A second solution was prepared by dissolving 59 grams of 85 weight percent technical-grade KOH pellets into 274 grams of deionized water, such that the solution was about 15 weight percent KOH. A teflon-coated thermometer was suspended into the mixing ferric chloride solution, and the heating plate was turned on. The temperature of the ferric chloride solution was brought to 65° C. and was controlled throughout the synthesis to remain between 65° C. and 70° C. Using a valved graduated pipet, the potassium hydroxide (KOH) solution was added to the heated ferric chloride solution at the rate of about 0.07 milliliters per second until all of the solution was added, about 1 hour. The resulting slurry was removed from the heat and mixing was stopped. The slurry was then filtered on a 10 micron to 15 micron pore-sized glass filter under vacuum. The filtrate solution obtained was mainly clear, with a few suspended hydrated iron oxide solids, and was discarded. The beta-$Fe_2O_3$ wet cake was mainly yellow-tan in color with a slight amount of dark brown $Fe_2O_3$ material present which was not beta-$Fe_2O_3$, and was analyzed to contain about 8.5 weight percent Fe.

The synthesized monohydrated beta-ferric oxide material was tested in a laboratory reaction in the synthesis of potassium ferrate dry powder product. Again by the method given in Example 2, a chlorinated caustic filtrate solution was synthesized which was analyzed to include 9.1 weight percent KOCl and 33.0 weight percent KOH. About 190 grams of this solution was placed into a small beaker and vigorously mixed by use of a teflon-coated magnetic stirring bar. Potassium metaperiodate ($KIO_4$) in an amount of 0.35 grams was dissolved in a small amount of deionized water and added to the solution which was mixed thoroughly. The beta-$Fe_2O_3$ wet cake weighing 25 grams was added to the mixing solution in three equal increments over a two hour period of time at a maintained reaction temperature of about 25° C. On each addition, the beta-$Fe_2O_3$ solids rapidly dispersed throughout the solution, forming a slurry. The reaction mixture was allowed to react under these conditions for 5 hours. A small sample of the slurry which weighed 13.0 grams was filtered using the vacuum filter with polypropylene filter cloth described above. The filtrate obtained which weighed 11.4 grams was analyzed to include 6.8 weight percent KOCl and 28.7 weight percent KOH. The remaining wet cake weighed 1.6 grams and was analyzed to include 27.3 weight percent $K_2FeO_4$. These experimental results were used to calculate the following yields on the process: 84.6 weight percent yield of $K_2FeO_4$ based on beta-$Fe_2O_3$ fed to the process, and 73.3 weight percent filtrate yield of $K_2FeO_4$ based on KOCl consumed while passing through the process.

For further comparison, a monohydrated beta-ferric oxide material was synthesized by the method described above using KOH resulting in wet cake which was again mainly yellow-tan beta-$Fe_2O_3$ with slight amounts of darkish-brown impurities, such as hydrated iron oxides other than beta-$Fe_2O_3$. This wet cake was placed into an open glass dish and stored while exposed to the air for about 5 days. At the end of this period of time, it was observed that the wet cake had turned much browner and darker than when it was first synthesized. The cake material, which was analyzed as including about 12 weight percent iron, was then tested in the ferrate synthesis reaction by the method given in Example 2 using a chlorinated caustic filtrate which analyzed about 12 weight percent KOCl and 34 weight percent KOH. After 4 hours of reaction time, only slight soluble purple ferrate was made, with only slight precipitation of tiny $K_2FeO_4$ crystals in the reaction slurry. The reaction slurry stayed darkish brown rather than the expected dark blackish-purple, indicating low yields of $K_2FeO_4$.

These experimental results illustrate that the use of monohydrated beta-iron oxide which has been synthesized by the process of this invention is very stable with respect to storage time. It also illustrates that the use of both the newly synthesized beta-$Fe_2O_3$ and the six-week stored beta-$Fe_2O_3$ result in high yields of potassium ferrate with respect to raw materials fed to the ferrate synthesis process. The other process described using KOH is more difficult to perform, and produces a beta-$Fe_2O_3$ which is impure, and as a result gives lower yields of ferrate when fed to the reaction process. Moreover, the beta-$Fe_2O_3$ produced by the other process is unstable with respect to storage time, and after a short time has elapsed, gives low yields of potassium ferrate with respect to raw materials fed to the reaction process. These results are summarized in the following Table V:

TABLE V

| | Fresh beta-$Fe_2O_3$ | 6 month old beta-$Fe_2O_3$ |
|---|---|---|
| Preferred Method for producing Beta-$Fe_2O_3$ | 54.2 weight % $K_2FeO_4$<br>91.1% yield-Fe<br>72.0% yield-KOCl | 43.2 weight % $K_2FeO_4$<br>94.5% yield-Fe<br>76.1% yield-KOCl |
| | Fresh beta-$Fe_2O_3$ | 5 day old beta-$Fe_2O_3$ |
| Comparison Method for producing beta-$Fe_2O_3$ | 27.3 weight % $K_2FeO_4$<br>84.6% yield-Fe<br>73.3% yield KOCl | - no product |

While various embodiments of the present invention have been described in detail, it is apparent that modifications and adaptations of those embodiments will occur to those skilled in the art. However, it is to be expressly understood that such modifications and adaptations are within the spirit and scope of the present invention, as set forth in the following claims.

What is claimed is:

1. A method for making an alkali metal ferrate comprising:
   (a) mixing $FeCl_3$, a carbonate salt, an oxidizing agent and a phosphate to form a first reaction mixture;

(b) subjecting said first reaction mixture to a sufficient temperature for a sufficient period of time to produce monohydrated beta-$Fe_2O_3$;

(c) recovering said monohydrated beta-$Fe_2O_3$ from said first reaction mixture;

(d) combining said monohydrated beta-$Fe_2O_3$ with a caustic chlorinated solution comprising a hypohalite and an alkali metal hydroxide to form a second reaction mixture;

(e) subjecting said second reaction mixture to a sufficient temperature for a sufficient period of time to bring about a reaction to produce alkali metal ferrate.

2. The method of claim 1, wherein said carbonate salt is selected from the group consisting of $K_2CO_3$, $Na_2CO_3$ and mixtures thereof.

3. The method of claim 1, wherein a basic feed comprising from about 5 weight percent to about 50 weight percent carbonate salt is added to a ferric-containing feed to form said first reaction mixture.

4. The method of claim 1, wherein the temperature of the first reaction mixture is at least about 50° C.

5. The method of claim 1, wherein the temperature of the first reaction mixture is in the range from about 55° C. to about 85° C.

6. The method of claim 1, wherein the temperature of the first reaction mixture is in the range from about 65° C. to about 75° C.

7. The method of claim 1, further comprising recovering said monohydrated beta-$Fe_2O_3$ from said first reaction mixture through use of a centrifugal decanter.

8. The method of claim 1, wherein said phosphate is $K_3PO_4$.

9. The method of claim 3, wherein said basic feed comprises from about 0.02 weight percent to about 0.2 weight percent phosphate.

10. The method of claim 1, wherein said oxidizing agent is $KIO_4$.

11. The method of claim 3, wherein said basic feed comprises from about 0.05 weight percent to about 0.3 weight percent oxidizing agent.

12. The method of claim 1, wherein said carbonate salt is $K_2CO_3$.

13. The method of claim 1, wherein a basic feed comprising about 50 weight percent $K_2CO_3$ is a ferric-containing feed to form said first reaction mixture.

14. The method of claim 1, wherein said first reaction mixture has a pH of at least about pH 9.

15. The method of claim 1, wherein said first reaction mixture has a pH of at least about pH 10.

16. The method of claim 3, wherein said ferric-containing feed comprises a solution of about 41 weight percent $FeCl_3$.

17. The method of claim 1, wherein said first reaction mixture is subjected to said temperature for a period of about 0.1 hours to about 0.5 hours.

18. The method of claim 1, further comprising recovering said alkali metal ferrate from said second reaction mixture through use of a basket centrifugal filter.

19. The method of claim 1, further comprising the steps of:

(a) recovering said alkali metal ferrate from said second reaction mixture; and (b) heating said alkali metal ferrate in the presence of air and $CO_2$ to form a ferrate cake.

20. The method of claim 1, further comprising the steps of:

(a) recovering said alkali metal ferrate from said second reaction mixture; and (b) heating said alkali metal in the range from about 60° C. to about 90° C. in the presence of air and $CO_2$ to form a ferrate cake.

21. The method of claim 1, further comprising recovering said alkali metal ferrate from said second reaction mixture and recycling the remaining reaction mixture.

22. The method of claim 1, further comprising:

(a) recovering said alkali metal ferrate from said second reaction mixture leaving a reuseable filtrate;

(b) adding an alkali metal hydroxide and $Cl_2$ to said reuseable filtrate;

(c) subjecting said reuseable filtrate to sufficient temperature for a sufficient period of time to form an alkali metal hypochlorite;

(d) combining said reuseable filtrate with monohydrated beta-$Fe_2O_3$ to form a recycled reaction mixture;

(e) subjecting said recycled reaction mixture to a sufficient temperature for a sufficient period of time to bring about a reaction to produce alkali metal ferrate.

23. The method of claim 1, wherein said caustic chlorinated solution comprises from about 15 weight percent to about 45 weight percent alkali metal hydroxide.

24. The method of claim 1, wherein the second reaction is carried out for a period from about 1 hour to about 6 hours.

25. The method of claim 1, wherein the second reaction is carried out at a temperature from about 18° C. to about 25° C.

26. The method of claim 1, wherein the hypohalite is selected from the group consisting of KOCl, KOBr and mixtures thereof.

27. The method of claim 1, wherein said caustic chlorinated solution comprises from about 7 weight percent to about 18 weight percent hypohalite.

28. The method of claim 1, wherein KI is added to said second reaction mixture.

29. The method of claim 3, wherein from about 0.2 weight percent to about 0.6 weight percent inorganic acid is added to said ferric-containing feed.

30. The method of claim 1, wherein the molar ratio of hypohalite to iron in said second reaction mixture is from about 2:1 to about 20:1.

31. The method of claim 1, wherein the molar ratio of hypohalite to iron in said second reaction mixture is about 5:1.

32. A method for producing alkali metal ferrate in an oxidizing reactor wherein high purity, stable beta-$Fe_2O_3$ capable of being stored at ambient temperatures in the atmosphere is employed as a source of iron and wherein said beta-$Fe_2O_3$ is introduced into said oxidizing reactor containing an aqueous solution comprising an alkali metal hydroxide, an alkali metal hypohalite, and a ferrate stabilizing compound, wherein said ferrate stabilizing compound comprises a tellurium-containing salt.

33. A method for producing alkali metal ferrate in an oxidizing reactor wherein high purity, stable beta-$Fe_2O_3$ capable of being stored at ambient temperatures in the atmosphere is employed as a source of iron and wherein said beta-$Fe_2O_3$ is introduced into said oxidizing reactor containing an aqueous solution comprising an alkali metal hydroxide, an alkali metal hypohalite, and a ferrate stabilizing compound, wherein said ferrate stabilizing compound comprises a potassium tellurium-containing salt or a sodium tellurium-containing salt.

* * * * *